(12) United States Patent
Patel et al.

(10) Patent No.: US 6,499,697 B1
(45) Date of Patent: Dec. 31, 2002

(54) DEPLOYABLE FLEXIBLE AIRLOCK

(75) Inventors: Vipul P. Patel, Irvine, CA (US); Al MacKnight, Lakewood, CA (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 09/884,401

(22) Filed: Jun. 18, 2001

(51) Int. Cl.[7] ................................................ B64G 1/22
(52) U.S. Cl. .................................. 244/158 R; 244/161
(58) Field of Search ........................... 244/158 R, 159, 244/161, 137.2; 405/188, 189, 192; 14/71.5; 166/340–343, 349, 338

(56) References Cited

U.S. PATENT DOCUMENTS

| | | | |
|---|---|---|---|
| 1,070,639 A | * | 8/1913 | Topper |
| 3,364,836 A | | 1/1968 | Boylan et al. |
| 3,537,668 A | | 11/1970 | Kosmo et al. |
| 3,639,934 A | * | 2/1972 | Eggert, Jr. .................. 14/71.72 |
| 3,952,976 A | | 4/1976 | Fletcher et al. |
| 4,120,067 A | * | 10/1978 | Home et al. .................. 14/71.5 |
| 4,669,413 A | | 6/1987 | Cummins |
| 4,809,936 A | | 3/1989 | Whitaker |
| 4,860,975 A | | 8/1989 | Schliesing et al. |
| 5,086,999 A | | 2/1992 | Mullen |
| 5,429,851 A | | 7/1995 | Sallee |
| 5,580,013 A | | 12/1996 | Velke |
| 6,321,746 B1 | * | 11/2001 | Schneider et al. ..... 128/202.12 |

* cited by examiner

*Primary Examiner*—Galen L. Barefoot
(74) *Attorney, Agent, or Firm*—William J. Zak, Jr., Esq.

(57) ABSTRACT

The deployable flexible airlock and method for space vehicles, modules, and other structures has a flexible conduit attached between a vehicle frame member and a distal frame member. The airlock may be integrated into the hatch of a space vehicle. In the stowed configuration the airlock occupies a small volume to minimize the usable space impact to the space vehicle. The airlock is deployed by introducing vehicle cabin air into a number of support columns or tubes, which thereby inflate and cause the distal frame member to be pushed away from the vehicle frame member. When deployed, a chamber is formed for a user to transition through the airlock. The airlock is pressurized using cabin air and depressurized by evacuating the cabin air. Retraction of the airlock for stowage is accomplished by use of cables attached to the distal frame member, and controlled by actuator assemblies attached to the vehicle frame member.

15 Claims, 3 Drawing Sheets

DEPLOYABLE FLEXIBLE AIRLOCK

BACKGROUND OF THE INVENTION

This invention relates to airlock systems used with space vehicles. The new deployable flexible airlock has a flexible conduit to allow storage of the airlock in a compact manner, and extension of the airlock to accommodate transfer between the vehicle interior and the exterior space environment.

Airlocks have been used in space operations for human cargo space vehicles such as the U.S. Space Shuttle, as well as for space station entry and egress. These systems are typically rigid wall structures that have a volume appropriate to the egress/ingress requirements of the items or humans to be accommodated. This type of rigid structure airlock consumes space such as on the Space Shuttle, which could otherwise be used for alternate purposes when the airlock is not being used.

Flexible tunnels are known in the art of space operations for use in connecting elements of space habitats, cargo modules and the like, as well as for access to the exterior of a space vehicle or platform. An example of a deployable flexible tunnel is disclosed in U.S. Pat. No. 3,952,976 (issued Apr. 27, 1976). In this invention, a flexible tunnel wall material is attached at each end to a frame member for attachment to a structure or module. The system uses sets of cables to control the expansion and contraction of the tunnel as permitted by externally positioned orienting means. These types of tunnels depend on external positioning apparatus to control the length and shape of the extended tunnel. The internal cables control the range of motion allowed. The system cannot be used as an expanded self-sustaining structure, and it has no provision to be used as an airlock.

Another example of a system utilizing a flexible tunnel concept is found in U.S. Pat. No. 3,537,668 (issued Sep. 12, 1969). In this instance the flexible tunnel is associated with an extra vehicular suit unit for use by a human for external activities relative to a vehicle or module. Again, as discussed regarding other flexible tunnels, a cable apparatus is used to control the extension length and shape of the tunnel. The tunnel is actually expanded by air pressure created in the tunnel and attached suit unit. This invention does not include provision for an airlock, which a human could use to egress/ingress the vehicle. Any opening to perform such a function would allow pressurized air to escape, causing the tunnel to collapse on the cables. This system is designed to be used in cooperation with an airlock and has no provision for self-sustaining structure if egress/ingress between vehicle and external environment is necessary.

As can be seen, there is a need for a simple, compact airlock system and method for use in space operations where storage and living space is at a premium.

SUMMARY OF THE INVENTION

One aspect of the present invention involves a deployable flexible airlock comprises a flexible conduit with a frame member at each end, and structure for operation with access doors for entry and exit of the airlock. In one embodiment, the extension of the airlock is accomplished by introduction of air pressure into flexible support columns attached at their ends to the frame members. The airlock is retracted by the use of cables to be latched in a stowed position.

Another aspect of the present invention involves a method for use of a deployable flexible airlock that comprises the deploying or extension of the airlock by introducing air pressure into flexible support columns, thereby causing their expansion which separates the two frame members in space and extends the flexible tunnel walls. A vehicle access door may then be used for access to the airlock and an environmental access door used for access to space and return therefrom. When not in use, the airlock is retracted by cables and the frame members are attached.

These and other features, aspects and advantages of the present invention will become better understood with reference to the following drawings, description, and claims.

DETAILED DESCRIPTION OF THE INVENTION

The following detailed description is one of the best currently contemplated modes of carrying out the invention. The description is not to be taken in a limiting sense, but is made merely for the purpose of illustrating the general principles of the invention, since the scope of the invention is best defined by the appended claims.

Figure 1:
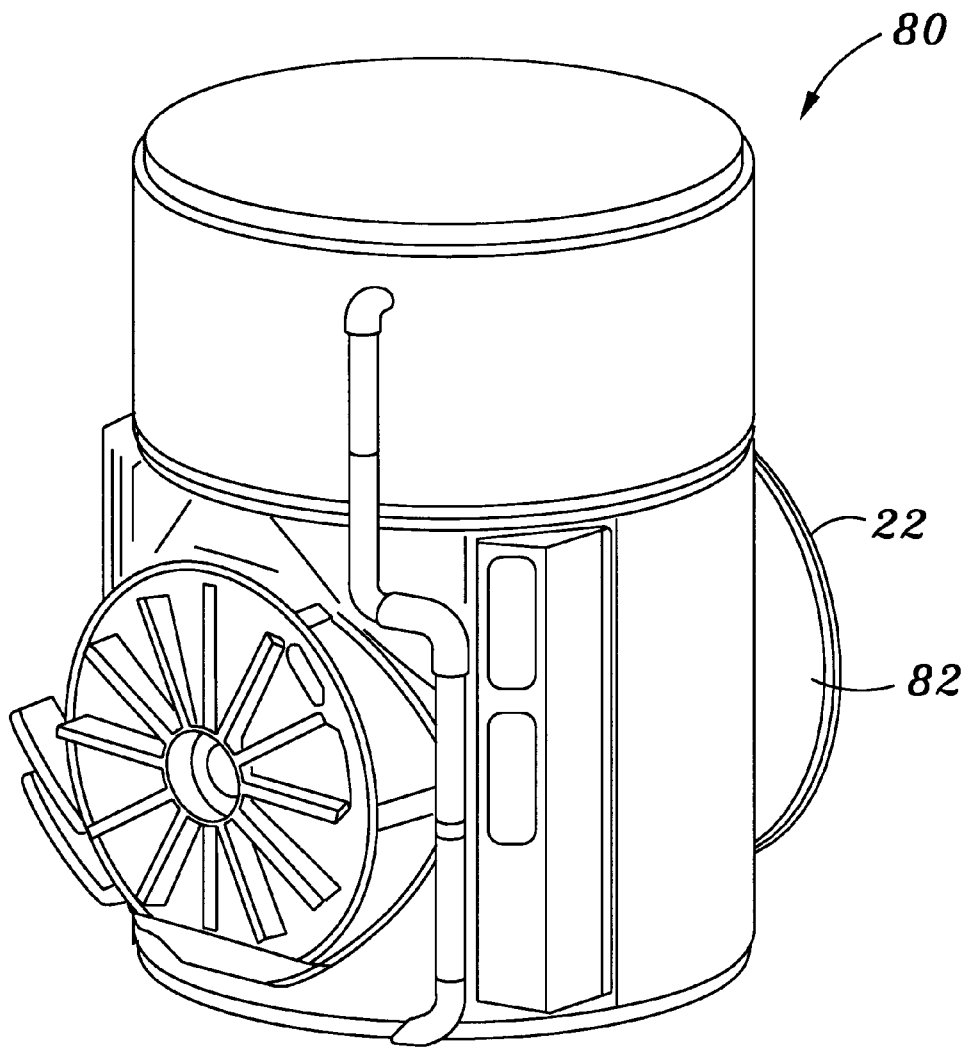
FIG. 1 illustrates a prior art rigid wall air lock for the U.S. Space Shuttle that is currently used.
Figure 3:
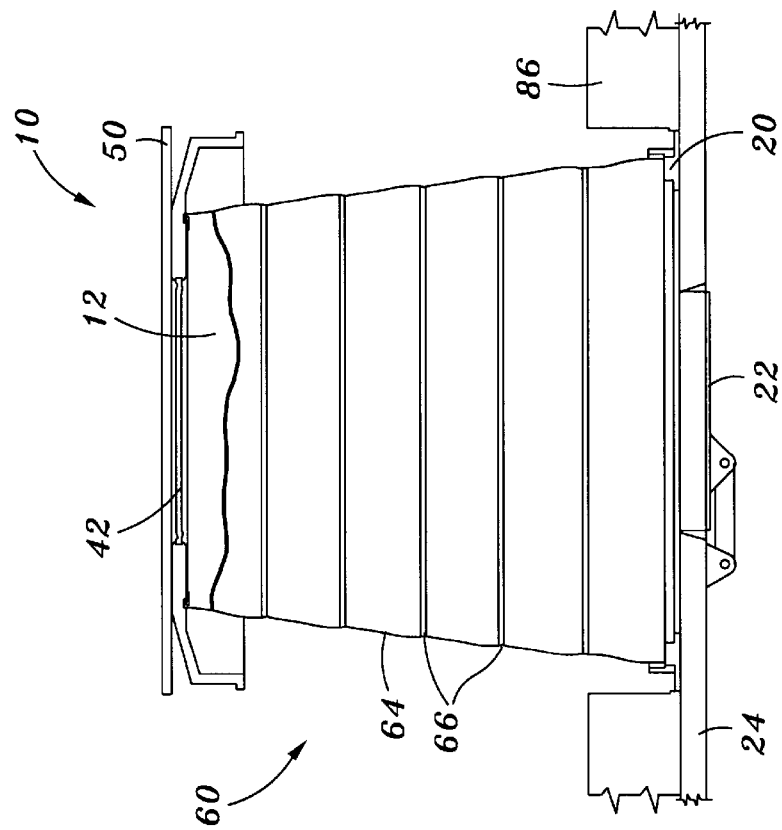
FIG. 3 illustrates a side view of the airlock in the deployed position according to an embodiment of the present invention.
Figure 2:
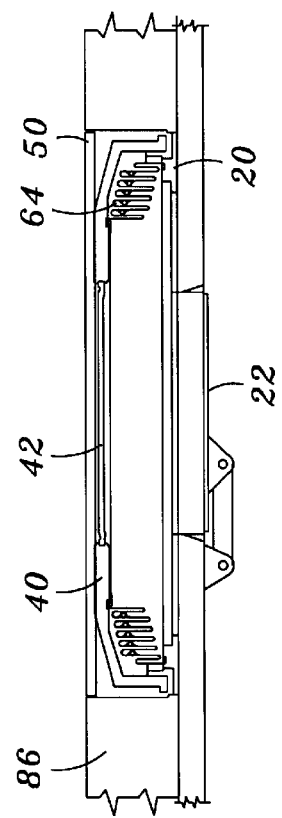
FIG. 2 illustrates a side cross-sectional view of the airlock in the stowed position according to an embodiment of the present invention.

Referring to FIGS. 1 through 3, a deployable flexible airlock 10 is illustrated with a vehicle frame member 20, a distal frame member 40, and a flexible wall conduit 60 therebetween. A shuttle airlock 80 used with the U.S. Space Shuttle is a rigid wall structure that must be located interior to the vehicle structure and attached to a spacecraft access hatch 22 by port 82. In the instance of airlock 10, the conduit 60 is flexible such that it may be stowed in a compact manner as illustrated in FIG. 2. In the stowed configuration in an example embodiment, the stowed airlock 10 may be integrated into the wall structure of the space vehicle to minimize elements occupying space interior to the vehicle. An outer protective layer 50, which may be part of the vehicle outer hull structure, protects the stowed airlock during vehicle launch and re-entry to earth atmosphere. This layer 50 is installed so that it can be removed during deployment of the airlock. The layer 50 is re-deployed after the airlock is retracted back to the stowed position.

The airlock 10 in the deployed configuration, as illustrated in FIG. 3, allows aggress and ingress of the vehicle through the space encompassed by conduit 60. A user may exit the vehicle by entering the airlock 10 through vehicle access hatch 22. The air may then be evacuated from the airlock 10. Finally, the user may exit the airlock 10 through environmental access hatch 42. This process may be reversed to re-enter the vehicle. While a circular airlock 10 in generally cylindrical form is illustrated, other form factors may also be used such as square or rectangular and the like.

Figure 4:
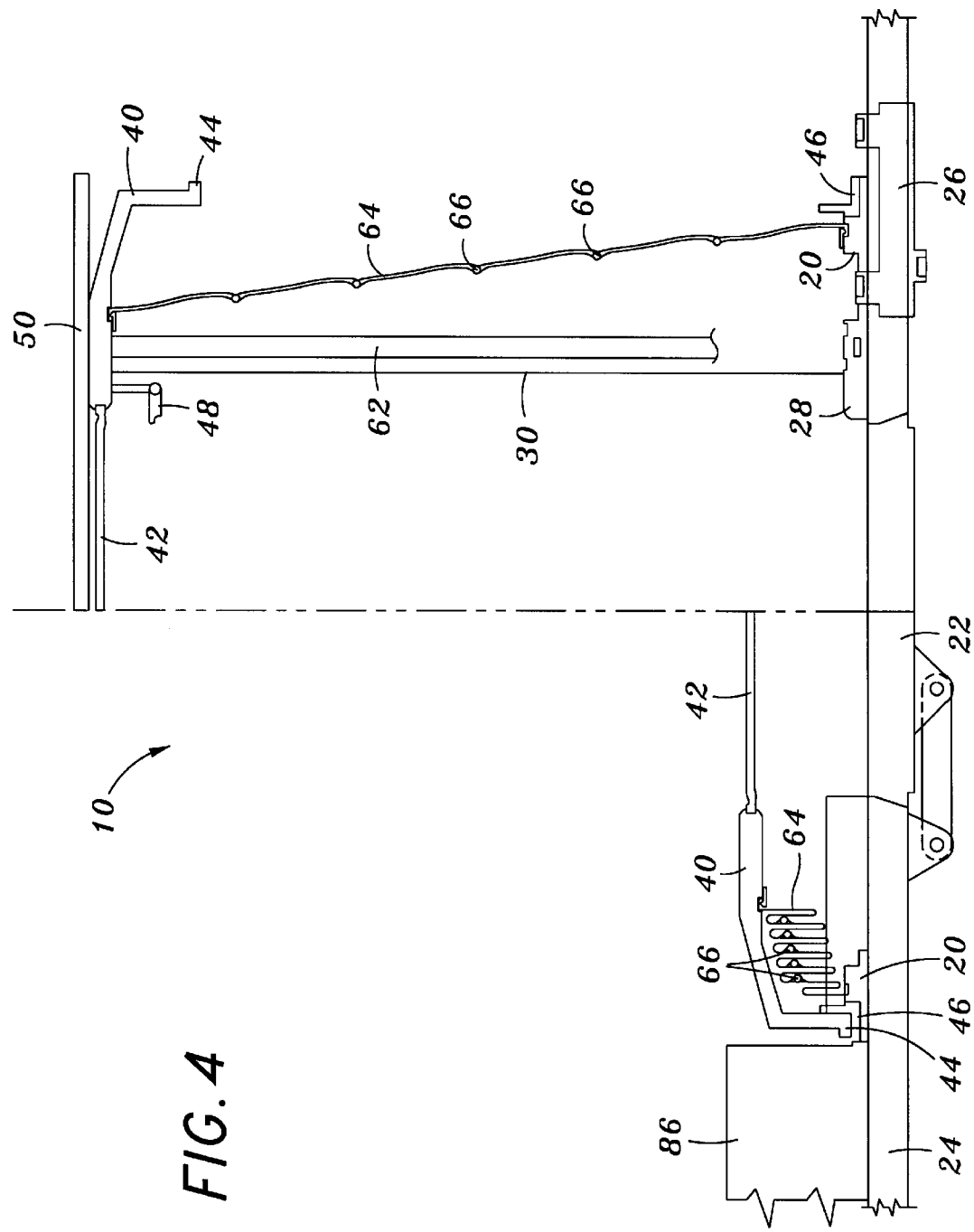
FIG. 4 illustrates a side schematic view of the airlock sectioned in half, with one half deployed and the other half stowed.

Referring to FIGS. 2 through 4, the airlock 10 may have a circular vehicle frame member 20 integrated with the interior wall 86 of a vehicle. Alternatively an interior mounting plate 24 may be attached to the interior wall 86 to support the airlock 10. The interior mounting plate 24 incorporates a vehicle access hatch 22. The vehicle frame member 20 may have an airlock apparatus 26 to control: the flow of air into the airlock chamber 12 and a plurality of support columns 62 interior to conduit 60, and the evacuation of air from the chamber 12 and the support columns 62. The airlock apparatus 26 may sense the external environment, internal vehicle, chamber 12 and the support columns 62, pressure to facilitate control of the airlock 10 deployed/stowed status and the environment necessary for each step of user activity in transiting the airlock 10.

The vehicle frame member 20 may incorporate attachment of the proximal end of conduit 60 and proximal ends of support tubes 62. The distal ends of these elements may be attached to the distal frame member 40. When the airlock apparatus 26 introduces air into chamber 12 and support columns 62, the distal frame member 40 is forced by air pressure away from vehicle frame member 20. The support columns 62 maintain the airlock 10 in the deployed position whether or not air pressure is maintained in chamber 12.

A rotary actuator assembly 28 having an extensible cable 30 may be mounted to the vehicle frame member 20. The distal end of the cable 30 may be attached to the distal frame member 40. The actuator assembly 28 may be operated to retract cable 30 thereby drawing the distal frame member 40 toward vehicle frame member 20. Generally more than one actuator assembly 28 and cable 30 may be used with an airlock 10.

As the distal frame member 40 is retracted, the conduit 60 wall 64 is folded as illustrated in FIGS. 2 and 4. The wall 64 may have frames 66 spaced at intervals therein to provide support for the wall 64, which may be formed from a flexible fabric material suitable for the space environment, for example, protection from radiation, thermal environment, and micrometeorite impact. When the distal frame member 40 is fully retracted, latch 44 engages latch mechanism 46, attached to vehicle frame member 20.

The environmental access door 42 is illustrated as a fabric door with sealed zipper closure providing a weight advantage; however, other door forms and configurations may be used. There is also a handrail 48 illustrated to aid the user in entry and exit through the environmental access door 42.

When used in one embodiment, the airlock 10 may be integrated into the hatch of a vehicle. In the stowed position, the airlock 10 would occupy a minimum volume of space.

In preparation for use of the airlock, vehicle cabin air may be provided to the support columns 62, illustrated as tubes, through the airlock apparatus 26. The support columns 62 thereby inflate to deploy or extend the airlock 10. When the support columns 62 have inflated, the airlock 10 may be pressurized using a pressurization switch inside the vehicle cabin. The pressurization may be halted at approximately 5 psia to perform an airlock 10 integrity check. After completion of pressurization, the vehicle access hatch 22 will be released to enable the opening of the airlock 10 from the vehicle.

Once a user has entered the airlock 10, the vehicle access hatch 22 may be closed. This may enable a depressurization switch of the airlock apparatus 26 that may be used to evacuate the air from the airlock 10, but keep the support columns 62 inflated. The depressurization may be halted at approximately 5 psia to perform a leak check of the user's spacesuit system. When depressurization is complete, the environmental access hatch 42 will be released and the user may exit into the space environment.

The ingress of the user to the vehicle may reverse the egress procedure. After the user has entered the airlock 10 and closed the environmental access hatch 42, the pressurization switch may be enabled from within airlock chamber 12 or the vehicle cabin. Again, pressurization may be halted at 5 psia to perform an airlock 10 integrity check. After pressurization is complete, the vehicle access hatch 22 will be released to enable entry into the vehicle.

After inflation, the airlock 10 may remain deployed for other use. For stowage, the vehicle access hatch 22 is secured and the airlock 10 is depressurized. The actuator assembly 28 may be activated to retract the cables 30 to retract the distal frame member 40. At the same time, the pressure within the support columns 62 may be relieved to the vehicle cabin environment to enable a controlled retraction of the airlock 10. After retraction is complete, the airlock 10 may be secured using the latch mechanism 46. environment to enable a controlled retraction of the airlock 10. After retraction is complete, the airlock 10 may be secured using the latch mechanism 46.

It should be understood, of course, that the foregoing relates to preferred embodiments of the invention and that modifications may be made without departing from the spirit and scope of the invention as set forth in the following claims.

We claim:

1. An airlock structure system for use in egress and ingress of space vehicles, modules and structures comprising:

a first frame member attachable to an access hatch of a vehicle;

a flexible inflatable material attached to said first frame member;

a second frame member attached to said flexible inflatable material;

said frame members and said material being configured for forming a conduit chamber whereby said second frame member is distal from said first frame member;

an environmental access hatch integral with said second frame member;

a plurality of flexible inflatable members attached to said first frame member and said second frame member for providing, upon inflation, inflatable support column members for said conduit chamber;

apparatus positioned for inflating said inflatable support column members and said flexible inflatable material for forming and deploying said conduit chamber; and a retracting system for retracting said second frame member and thereby said flexible inflatable members, said flexible inflatable material and said second frame member for stowage.

2. The airlock structure system as in claim 1 wherein said first frame member is configured for being attachable to an interior mounting plate of a vehicle.

3. The airlock structure system as in claim 1 wherein said airlock apparatus is configured for introducing vehicle cabin air into said inflatable members.

4. The airlock structure system as in claim 1 wherein said retracting system comprises:

a plurality of cables attached to said second frame member for retracting said second frame member; and a plurality of actuator assemblies for controlling said plurality of cables.

5. The airlock structure system as in claim 1 further comprising a plurality of lateral circumferential frame members positioned between said first frame member and said second frame member for supporting said conduit chamber.

6. The airlock structure system as in claim 1 further comprising:
   a latch positioned on said second frame member; and
   a latch mechanism positioned on said first frame member for engagement with said latch.

7. An airlock structure system for use in egress and ingress of space vehicles, modules and structures comprising:
   a first frame member attachable to an access hatch of a vehicle;
   a flexible inflatable material attached to said first frame member;
   a second frame member attached to said flexible material;
   a plurality of circumferential frame members positioned between said first frame member and said second distal frame member;
   said frame members and said flexible material being configured for forming a conduit chamber whereby said second frame member is distal from said first frame member;
   an environmental access hatch integral with said second frame member;
   a plurality of flexible inflatable members attached at an end to said first frame member and at an opposite end to said second frame member for providing, upon inflation, support columns for said conduit chamber;
   an apparatus positioned in communication with said support columns, said chamber, an airlock external environment, and a vehicle cabin for inflating said inflatable members and said flexible inflatable material for forming and deploying said conduit chamber;
   a plurality of cables attached to said first frame member and attached to said second frame member; and
   a plurality of actuator assemblies for controlling said cables for retracting said second frame member and thereby said flexible inflatable members, said flexible inflatable material, and said second frame member for stowage.

8. The airlock structure system as in claim 7 wherein said actuator assemblies and said cables are positioned internal to said chamber.

9. A method for egress of vehicles, modules and structures, comprising steps of:
   introducing gas pressure into a plurality of flexible inflatable members for forming support columns of a deployable flexible airlock structure system integral with a vehicle access hatch;
   forming a conduit chamber upon introducing said gas pressure;
   introducing gas under pressure into said conduit chamber;
   entering said airlock through said vehicle access hatch;
   evacuating said gas from said conduit chamber; and
   exiting said airlock through an environmental hatch.

10. A method for ingress of vehicles, modules and structures, comprising steps of:
    introducing gas pressure into a plurality of flexible inflatable members for forming support columns of a deployable flexible airlock structure system, which is extendable from a first frame member integral with a vehicle access hatch to a second frame member whereby said second frame member is distal to said first frame member;
    introducing gas pressure into said flexible structure system for forming a conduit chamber, and for forming and deploying said flexible airlock structure system;
    entering said airlock structure system through an environmental access hatch;
    pressurizing said conduit chamber; and
    exiting said airlock structure system through said vehicle access hatch.

11. The method as in claim 10 further comprising a step of:
    retracting said distal second frame member which comprises activating an actuator assembly attached to said first frame member and controlling a cable attached to said second distal frame member.

12. The method as in claim 10 further comprising a step of:
    latching said second frame member to said first frame member.

13. A method for egress and ingress of vehicles, modules and structures, comprising steps of:
    deploying a flexible airlock structure system integrated with a vehicle access hatch using vehicle cabin air introduced into a plurality of flexible inflatable members thereby inflating the flexible members for forming support columns;
    pressurizing said flexible airlock structure system using a pressurization switch to introduce vehicle cabin air into the airlock structure system;
    releasing said vehicle access hatch after pressurization to enable entry into said airlock structure system;
    entering said airlock structure system and securing said vehicle access hatch;
    depressurizing said airlock structure system using a depressurization switch while maintaining pressure in said support columns;
    releasing an environmental access hatch after depressurization to enable exiting said airlock structure system into an open environment;
    entering said airlock structure system through said environmental access hatch and securing said environmental access hatch;
    pressurizing said airlock structure system using said pressurization switch to introduce vehicle cabin air into said airlock structure system;
    releasing said vehicle access hatch after pressurization;
    securing said vehicle access hatch and depressurizing said airlock structure system;
    relieving said air pressure in said support columns to a vehicle cabin environment to enable a controlled retraction of said airlock structure system;
    activating a plurality of actuator assemblies to retract a plurality of cables to retract a distal frame member and stow a flexible airlock wall; and
    securing said airlock structure system.

14. The method as in claim 13 further comprising a step of:
    halting said pressurization at approximately 5 psia and performing an airlock integrity check.

15. The method as in claim 13 further comprising a step of:
    halting the depressurization at approximately 5 psia and performing a user spacesuit system check.

* * * * *